(12) United States Patent
Nagy et al.

(10) Patent No.: US 8,344,579 B2
(45) Date of Patent: Jan. 1, 2013

(54) RADIAL PIN COUPLED HUB AND RIM ASSEMBLY

(75) Inventors: Attila Nagy, Fishers, IN (US); Balazs Palfrai, Fishers, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 231 days.

(21) Appl. No.: 12/841,434

(22) Filed: Jul. 22, 2010

(65) Prior Publication Data

US 2012/0019095 A1 Jan. 26, 2012

(51) Int. Cl.
*H02K 1/30* (2006.01)

(52) U.S. Cl. ............... 310/216.053; 310/420; 310/424; 310/261.1

(58) Field of Classification Search ............... 310/418, 310/419, 420–424, 431, 261.1, 216.004, 310/216.053

See application file for complete search history.

(56) References Cited

U.S. PATENT DOCUMENTS 4,475,873 A * 10/1984 Jensen et al. ............... 417/422
4,954,739 A * 9/1990 Schultz et al. ........... 310/156.43

FOREIGN PATENT DOCUMENTS

JP 58207836 A * 12/1983

* cited by examiner

*Primary Examiner* — Tran Nguyen
(74) *Attorney, Agent, or Firm* — Cantor Colburn LLP

(57) ABSTRACT

A rotor assembly includes a lamination and a hub. The hub includes an inner portion and an outer portion surrounding the inner portion and separated from it by an expansion gap. The rotor assembly also includes two or more connecting members coupling the inner portion to the outer portion, the connecting members having a first end and a second end.

14 Claims, 3 Drawing Sheets

_US 8,344,579 B2_

RADIAL PIN COUPLED HUB AND RIM ASSEMBLY

BACKGROUND

Exemplary embodiments pertain to the art of electric machines and, more particularly, to a rotor for an electric machine.

Many electric machines include a stator and a rotor. The rotor spins relative to the stator in response to an electrical current. Electric motors and generators are both examples of electric machines. An electric motor uses electrical energy to produce mechanical energy, typically through the interaction of magnetic fields and current-carrying conductors. Conversely, a generator produces electrical energy from mechanical energy.

The rotor may be formed of multiple parts. For instance, the rotor may include a hub through which a rod is passed. The rod engages the hub. The hub is typically surrounded by a rotor lamination. The rotor lamination may include magnets or wires disposed therein. Regardless, in the case of a motor, a current is applied to the stator which causes the rotor to turn. This causes the rod to turn and produce mechanical energy.

During operation, heat may cause portions of the rotor to expand. The heat may be caused due to electrical current passing through the rotor and stator. Some environments, such as an automobile engine, may experience high temperature swings and these swings may cause the rotor to expand.

Regardless of the cause, heat related rotor expansion may limit the materials used in rotor construction. In particular, heat expansion may require that the hub and the lamination be formed of the same or similar material. This requirement is due to stress that may be created if one of the portions expands due to heat (or motion) at a different rate than another portion.

BRIEF DESCRIPTION

Disclosed is an electric machine that includes a stator and a rotor assembly mounted, at least in part, within a portion of the stator and rotatable relative to the stator. The rotor assembly includes a lamination, a hub that includes an inner portion and an outer portion surrounding the inner portion and separated from it by an expansion gap and two or more connecting members coupling the inner portion to the outer portion, the connecting members having a first end and a second end.

Also disclosed is a rotor assembly that includes a lamination and hub. The hub includes an inner portion and an outer portion surrounding the inner portion and separated from it by an expansion gap. The hub also includes two or more connecting members coupling the inner portion to the outer portion, the connecting members having a first end and a second end.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
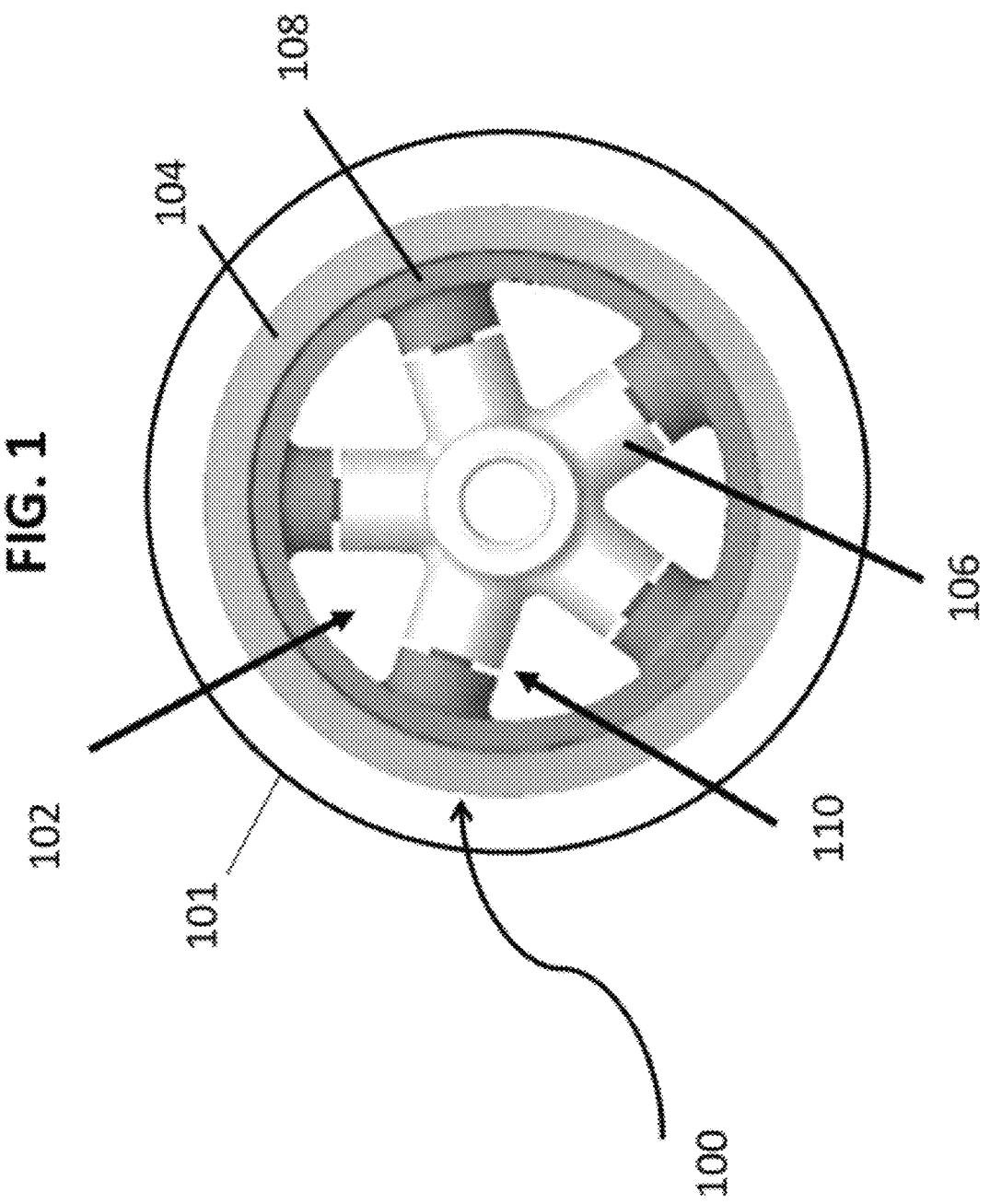
FIG. 1 shows an example of rotor assembly according to one embodiment.

FIG. 1 shows an example of rotor assembly 100 according to one embodiment. The rotor assembly 100 may be utilized in any type of electric machine. In one embodiment, the rotor 100 is utilized in an A/C motor. In operation, the rotor assembly 100 is surrounded by a stator 101 located within an electric machine having a housing.

The rotor assembly 100 includes a hub 102 surrounded by a lamination 104. The hub 102 is formed to mate with a rod (not shown). In one embodiment, the hub 102 is be formed of a first material having a first thermal expansion coefficient and the lamination 104 is be formed of a second material having a second thermal expansion coefficient. In one embodiment, the first thermal expansion coefficient is greater than the second thermal expansion coefficient.

Typically, a rotor hub and the lamination are formed of the same material. This ensures that the hub and lamination expand or contract at the same rate in the presence of a temperature change. Indeed, if a typical rotor hub was formed of a material having a greater thermal expansion coefficient than the lamination, as the hub expands faster than the lamination, high stresses are created.

Accordingly, one embodiment provides a rotor assembly 100 that includes a rotor hub 102 formed of different material than the lamination 104. In particular, the rotor hub 102 is formed of a material that expands faster due to an increase in temperature than the lamination 104.

In particular, one embodiment of the present invention is directed to a rotor assembly 100 that includes a rotor hub 102 formed of an inner portion 106 and an outer portion (rim) 108. The inner portion 106 and the outer portion 108 are formed of two separate pieces and are joined together by connecting members. In one embodiment, the connecting members are pins and are described in greater detail below.

In operation, the outer portion 108 contacts the lamination 104. The lamination 104 is typically formed of steel. In one embodiment, the outer portion 108 is formed of a softer material than the material forming the lamination 104. For example, the outer portion 108 is formed of aluminum in one embodiment.

In the event that the outer portion 108 expands faster than the lamination 104, the expansion is directed inwards. Accordingly, the inner portion 106 and the outer portion 108 are separated by one or more expansion gaps 110. As the outer portion 108 expands inwardly, the expansion gaps 110 vary in width as the temperature of the rotor assembly 100 varies.

In the event that the lamination 104 expands faster than the outer portion 108, the expansion is also directed inwards. Accordingly, the expansion gaps 110 allow for either the lamination 104 or the outer portion 108 to have the higher of two different thermal expansion coefficients. In addition, the expansion gaps 110 allow the rotor hub 106 to be formed of a different material than the outer portion 108 for the same reasons described above.

Figure 2:
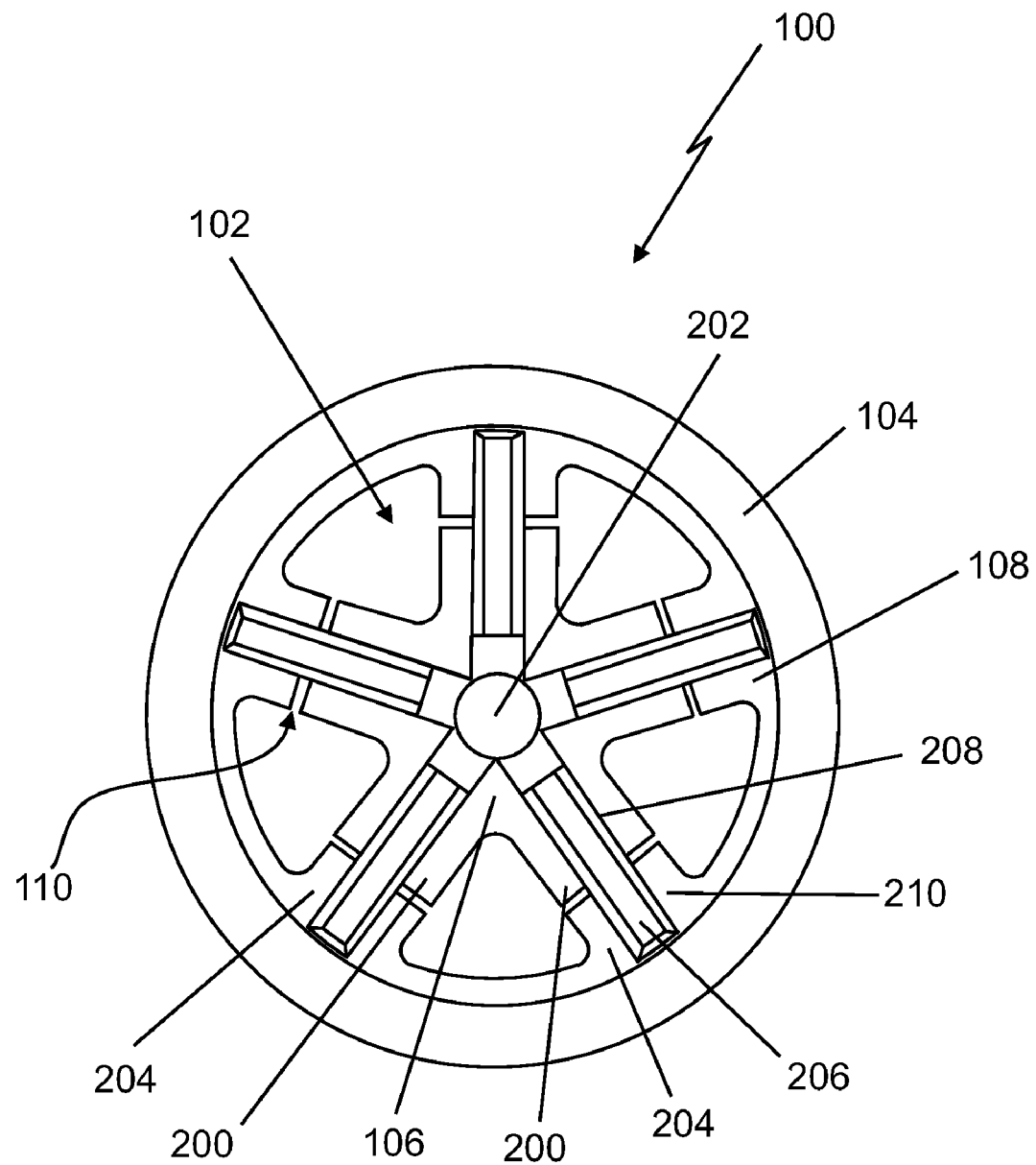
FIG. 2 is a section view of the rotor assembly shown in FIG. 1.

FIG. 2 is a section view of the rotor assembly 100 shown in FIG. 1. The inner portion 106 includes a plurality of spokes 200 that radially extend outwardly from a center hole 202. In operation, the center hole 202 surrounds and is coupled to a portion of a shaft (not shown). The number of inner spokes 200 is not limited. In one embodiment, the inner portion 106 may include two or more inner spokes 200. In the embodiment shown in FIG. 2, the inner portion 106 includes five inner spokes 200.

The outer portion 108 also includes outer spokes 204. These spokes 204 are arranged about the outer portion 108 so that they line up with the inner spokes 200.

In one embodiment, one or more of the inner spokes 200 includes a connecting member 206 disposed partially therein. That is, a first end 208 of one or more connecting members 206 is surrounded by an inner spoke 200. One or more of the outer spokes 204 surround a second end 210 of one or more connecting members 206. In this manner, rotation of inner portion 106 causes the outer portion 108 to rotate and vice-versa. Accordingly, the inner portion 106 and the outer portion 108 operate as a unity piece at least with respect to rotational motion. The connecting members 206 allow for creation of the expansion gaps 110 between the inner portion 106 and the outer portion 108.

As illustrated, the connecting members 206 are implemented as pins. In one embodiment, the connecting members 206 may be pins formed of hardened steel. Of course, other materials could be utilized. In one embodiment, the first end 208 is press fit into the inner portion 106 and the second end 210 is slip fit into the outer portion 108. In an alternative embodiment, the first end 208 is slip fit into the inner portion 106 and the second end 210 is press fit into the outer portion 108. Regardless of the actual implementation, the connecting members 206 allow for the inner portion 106 and the outer portion 108 to expand or otherwise move radially relative to one another. Such radial movement may allow, for example, rotor assembly 100 to have a lamination 104 to be formed of a different material than either or both the inner portion 106 or the outer portion 108. In particular, the radial movement may occur due to thermal expansion of the inner portion 106 or the output portion 108 occurring at a greater rate than in the lamination 104.

Figure 3:
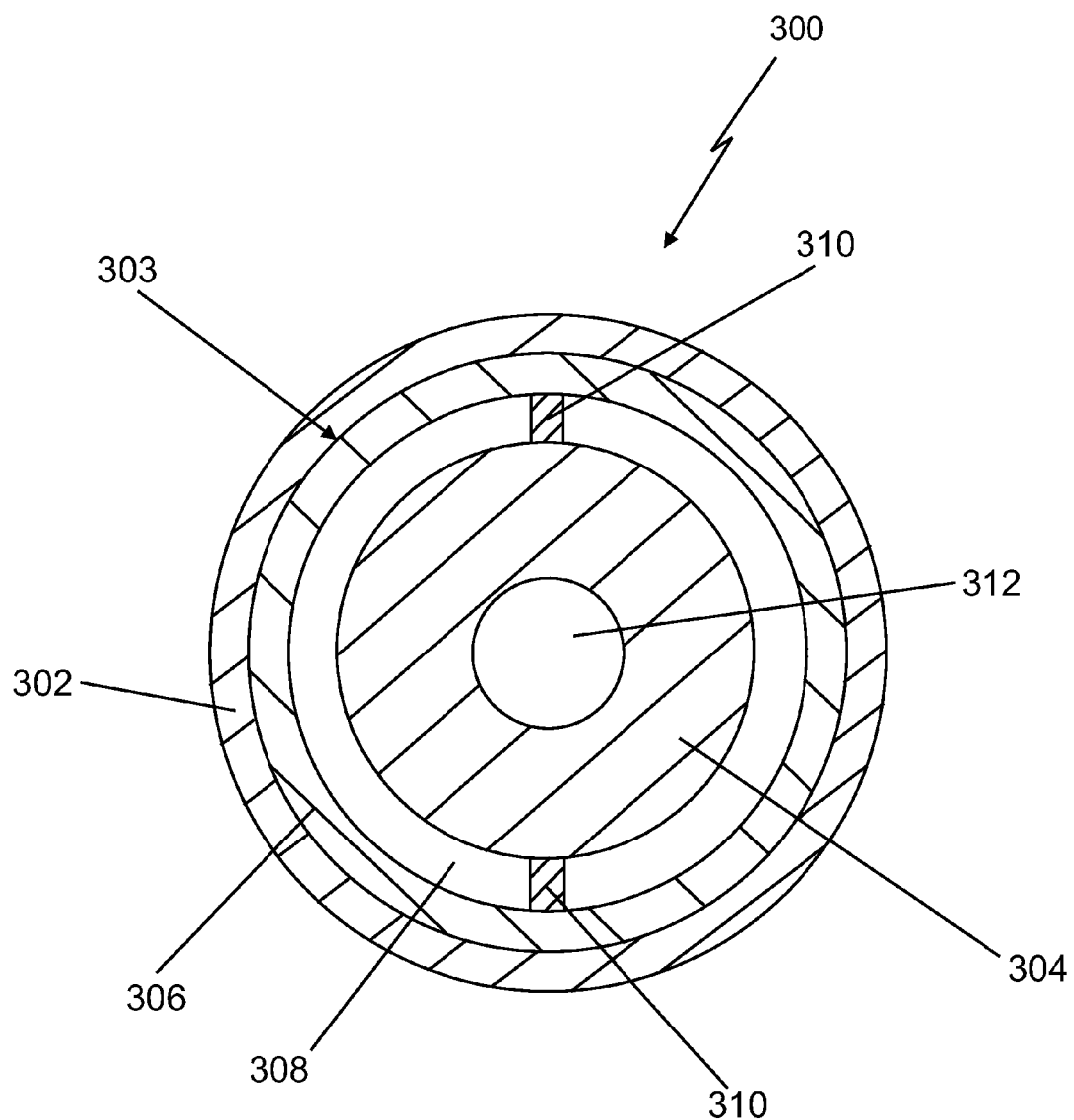
FIG. 3 shows an alternative embodiment of a rotor assembly 300.

FIG. 3 shows an alternative embodiment of a rotor assembly 300. The rotor assembly 300 of this embodiment includes a lamination 302. The lamination 302 surrounds and is in contact with a rotor hub 303 in this embodiment.

In this embodiment, the rotor hub 303 includes an inner portion 304 and an outer portion 306. The inner portion 304 is separated from the outer portion 306 by an expansion gap 308. The inner portion 304 is coupled to the outer portion 306 by two or more connecting members 310. In one embodiment, the inner portion 304 includes a hole 312 for connecting the inner portion to a shaft (not shown).

In one embodiment, a first end of the connecting members 310 is press fit into the inner portion 304 and the second end of the connecting members is slip fit into the outer portion 306. In an alternative embodiment, the first end is slip fit into the second portion 304 and the second end is press fit into the outer portion 306. Regardless of the actual implementation, the connecting members 310 allow for the inner portion 304 and the outer portion 306 to expand or otherwise move radially relative to one another.

As shown in both FIGS. 2 and 3, the connecting members are radially positioned about a center point of the rotor assembly. Of course, the connecting members could be offset relative to a center point. In addition, in any of the embodiments, the inner portion and the outer portion of the hub may be formed of cast aluminum and the connecting members formed of hardened steel.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
a stator;
a rotor assembly mounted, at least in part, within a portion of the stator, the rotor being rotatable relative to the stator, the rotor including:
a lamination;
a hub that includes an inner portion and an outer portion surrounding the inner portion and separated from the inner portion by an expansion gap; and
two or more connecting members coupling the inner portion to the outer portion, the connecting members having a first end and a second end; wherein the first end of at least one of the connecting members is slip fit into the outer portion and the second end of the at least one of the connecting members is press fit into the inner portion.

2. The electric machine of claim 1, wherein the lamination is formed of a material having a lower thermal expansion coefficient than a material forming the hub.

3. The electric machine of claim 2, wherein the lamination is formed of steel and the hub is formed of aluminum.

4. The electric machine of claim 1, wherein the connecting members are pins.

5. The electric machine of claim 4, wherein the pins are formed of hardened steel.

6. The electric machine of claim 1, wherein the inner portion includes inner spokes extending radially outwardly from an outer periphery of the inner portion and the outer portion includes outer spokes extending radially inwardly from an inner periphery of the outer portion.

7. The electric machine of claim 6, wherein the at least one of the connecting members has the first end encased in an inner spoke and the second end encased in an outer spoke.

8. A rotor assembly comprising:
a lamination;
a hub including:
an inner portion;
an outer portion surrounding the inner portion and separated from the inner portion by an expansion gap; and
two or more connecting members coupling the inner portion to the outer portion, the connecting members having a first end and a second end;
wherein the first end of at least one of the connecting members is press fit into the outer portion and the second end of the at least one of the connecting members is slip fit into the inner portion.

9. The electric machine of claim 8, wherein the lamination is formed of a material having a lower thermal expansion coefficient than a material forming the hub.

10. The rotor assembly of claim 9, wherein the lamination is formed of steel and the hub is formed of aluminum.

11. The rotor assembly of claim 8, wherein the connecting members are pins.

12. The rotor assembly of claim 11, wherein the pins are formed of hardened steel.

13. The rotor assembly of claim 8, wherein the inner portion includes inner spokes extending radially outward from an outer periphery of the inner portion and the outer portion includes outer spokes extending radially inward from an inner periphery of the outer portion.

14. The rotor assembly of claim 13, wherein the at least one of the connecting members has the first end encased in an inner spoke and the second end encased in an outer spoke.

* * * * *

UNITED STATES PATENT AND TRADEMARK OFFICE
CERTIFICATE OF CORRECTION

PATENT NO. : 8,344,579 B2  Page 1 of 1
APPLICATION NO. : 12/841434
DATED : January 1, 2013
INVENTOR(S) : Attila Nagy and Balazs Palfai It is certified that error appears in the above-identified patent and that said Letters Patent is hereby corrected as shown below:

Title page, Item 75, Inventors information, "Palfrai" should be changed to --Palfai--.

Signed and Sealed this
Seventh Day of May, 2013

Teresa Stanek Rea
*Acting Director of the United States Patent and Trademark Office*